United States Patent
Liu et al.

(10) Patent No.: US 11,638,490 B2
(45) Date of Patent: May 2, 2023

(54) METHOD AND DEVICE FOR IDENTIFYING PRODUCT PURCHASED BY USER AND INTELLIGENT SHELF SYSTEM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Wei Liu, Beijing (CN); Yu Chen, Beijing (CN); Qiang Liu, Beijing (CN); Zhi Weng, Beijing (CN); Yijun Feng, Beijing (CN); Zhongyu Zhang, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 245 days.

(21) Appl. No.: 16/977,716

(22) PCT Filed: Feb. 14, 2019

(86) PCT No.: PCT/CN2019/075074
§ 371 (c)(1),
(2) Date: Sep. 2, 2020

(87) PCT Pub. No.: WO2019/165891
PCT Pub. Date: Sep. 6, 2019

(65) Prior Publication Data
US 2021/0056498 A1 Feb. 25, 2021

(30) Foreign Application Priority Data
Mar. 2, 2018 (CN) .......................... 201810174871.3

(51) Int. Cl.
*G06Q 10/08* (2023.01)
*G06Q 30/00* (2023.01)
(Continued)

(52) U.S. Cl.
CPC ....... *G06Q 10/087* (2013.01); *G01G 19/4144* (2013.01); *G01G 19/52* (2013.01);
(Continued)

(58) Field of Classification Search
CPC .. G06Q 10/087; G06Q 30/0185; G06V 20/52; G06V 40/168; G06V 40/172;
(Continued)

(56) References Cited

U.S. PATENT DOCUMENTS

| 6,651,820 | B2 * | 11/2003 | Takizawa | ............. | B65G 1/1375 |
| | | | | | 209/583 |
| 10,664,795 | B1 * | 5/2020 | Worley | ................ | G06Q 10/087 |
| 2017/0293885 | A1 * | 10/2017 | Grady | ....................... | G06T 7/70 |

FOREIGN PATENT DOCUMENTS

| CN | 103606093 A | 2/2014 |
| CN | 107301538 A | 10/2017 |

(Continued)

OTHER PUBLICATIONS

International Search Report and Written Opinion dated Mar. 27, 2019 in PCT/CN2019/075074 (with English Translation), 20 pages.

*Primary Examiner* — Paul Danneman
(74) *Attorney, Agent, or Firm* — Oblon, McClelland, Maier & Neustadt, L.L.P.

(57) ABSTRACT

The present disclosure provides a method and device for identifying a product purchased by a user and intelligent shelf system. The method includes acquiring a weight of products carried in a container, acquiring a first monitoring image acquired in a monitoring area corresponding to the container, identifying the first monitoring image, and obtain-
(Continued)

ing an identification result, wherein the identification result comprises user identity information when it is determined that the weight of the products is reduced, acquiring a time when at least one product carried in the container is picked up, and determining information of at least one picked-up product, obtaining the user identity information corresponding to the at least one picked-up product, and associating the user identity information with the information of the at least one picked-up product.

11 Claims, 8 Drawing Sheets

(51) Int. Cl.
*G06V 20/52* (2022.01)
*G06V 40/16* (2022.01)
*G06V 40/20* (2022.01)
*G01G 19/414* (2006.01)
*G01G 19/52* (2006.01)
*G06N 3/08* (2023.01)
*G06Q 10/087* (2023.01)
*G06Q 30/018* (2023.01)
*G06F 18/22* (2023.01)

(52) U.S. Cl.
CPC ......... *G06F 18/22* (2023.01); *G06Q 30/0185* (2013.01); *G06V 20/52* (2022.01); *G06V 40/168* (2022.01); *G06V 40/172* (2022.01); *G06V 40/20* (2022.01); *G06N 3/08* (2013.01)

(58) Field of Classification Search
CPC .... G06V 40/20; G01G 19/4144; G01G 19/52; G06K 9/6215; G06N 3/08; G06F 18/22
See application file for complete search history.

(56) References Cited

FOREIGN PATENT DOCUMENTS

| CN | 107481414 A | 12/2017 |
| CN | 107644330 A | 1/2018 |
| CN | 107705436 A | 2/2018 |
| CN | 108198052 A | 6/2018 |

* cited by examiner

METHOD AND DEVICE FOR IDENTIFYING PRODUCT PURCHASED BY USER AND INTELLIGENT SHELF SYSTEM

CROSS-REFERENCE TO RELATED APPLICATIONS

This application is based on and claims the benefit of priority to the Chinese patent application No. 201810174871.3 filed on Mar. 2, 2018, which is hereby incorporated by reference in its entirety into the present application.

TECHNICAL FIELD

The present disclosure relates to the technical field of automatic vending, in particular to a method and device for identifying a product purchased by a user and an intelligent shelf system.

BACKGROUND

The development of the artificial intelligence technology brings great innovations to retail trades, and at present, many unmanned stores, unmanned supermarkets and the like open one after another. Sensing a purchased product and binding the product with a user are two important links in the whole shopping process. In a conventional retail store, the sensing of the purchased product and the binding to the customer are made through observations by naked eyes of shop assistants, and the whole process is completed manually. In a large supermarket, the sensing of the purchased product can be realized by scanning a bar code, so that a category of the product is identified, together with information such as price, thereby acquiring the product information. Most of current unmanned stores, unmanned supermarkets and the like adopt Radio Frequency Identification technology, and after a product is purchased by the user, the user can automatically acquire product information and bind the product to the user, which improves user experience.

SUMMARY

One or more embodiments of the present disclosure provides a method for identifying a product purchased by a user, comprising: acquiring a weight of products carried in a container; acquiring a first monitoring image acquired in a monitoring area corresponding to the container, identifying the first monitoring image, and obtaining an identification result, wherein the identification result comprises user identity information; when it is determined that the weight of the products is reduced, acquiring a time when at least one product carried in the container is picked up, and determining information of at least one picked-up product based on a change value of the weight of the products and an association relationship between the container and the products; obtaining user identity information corresponding to the at least one picked-up product based on the time when the at least one product carried in the container is picked up and the identification result, and associating the user identity information with the information of the at least one picked-up product.

In some embodiments, that obtaining user identity information corresponding to the at least one picked-up product based on the time when the at least one product carried in the container is picked up and the identification result comprises: determining a user identity identification time period based on the time when the at least one product carried in the container is picked up; acquiring the identification result corresponding to the first monitoring image acquired in the user identity identification time period as a target identification result; and if the user identity information in the target identification result is not a null value, taking the user identity information in the target identification result as the user identity information corresponding to the at least one picked-up product.

In some embodiments, the method further comprises: acquiring the user identity information and user feature information, and establishing an identity feature association relationship between the user feature information and the user identity information; acquiring a second monitoring image acquired in a shopping place, positioning the user in the second monitoring image based on the user feature information, and acquiring a tracking trajectory corresponding to the user; when it is determined that the user feature information changes, updating the identity feature association relationship based on new user feature information; and if the user identity information in the target identification result is a null value, determining the user identity information corresponding to the at least one picked-up product according to the identity identification time period and the identity feature association relationship.

In some embodiments, that determining the user identity information corresponding to the at least one picked-up product according to the identity identification time period and the identity feature association relationship comprises: acquiring the first monitoring image acquired in the identity identification time period, and extracting user feature information of a target user from the first monitoring image; comparing the user feature information of the target user with the user feature information in the identity feature association relationship; and if there is a successful match, taking the user identity information in the identity feature association relationship as the user identity information corresponding to the at least one picked-up product.

In some embodiments, that identifying the first monitoring image and obtaining an identification result comprises: acquiring the user identity information and a user face image; extracting a user face feature from the user face image, and establishing a face feature association relationship between the user face feature and the user identity information; extracting face feature information from the first monitoring image, and calculating a similarity between the face feature information and the user face feature in the face feature association relationship; and if the similarity is larger than a preset threshold, taking the user identity information in the face feature association relationship as the user identity information in the identification result corresponding to the first monitoring image.

In some embodiments, the method further comprises: acquiring coded information of the container and SKU information of the products placed on the container; and establishing an association relationship between the container and the products according to the coded information and the SKU information.

In some embodiments, that determining information of the at least one picked-up product based on a change value of the weight of the product and an association relationship between the container and the products comprises: determining the coded information of the container in which the weight of the products is reduced, and determining the SKU information of the picked-up product based on the coded information and the association relationship between the container and the product.

In some embodiments, that determining information of the at least one picked-up product based on a change value of the weight of the products and an association relationship between the container and the products further comprises: acquiring a product unit weight corresponding to the SKU information of the product; and determining quantity information of the at least one picked-up product based on the product unit weight and a reduced value of the weight of the products.

In some embodiments, the method further comprises: when it is determined that the weight of the products is increased, obtaining an increase in the weight of the products; and judging whether the product unit weight matches the increase in the weight of the products, and if not, prompting misplacement of the product.

In some embodiments, the method further comprises: identifying an operation action of the user in the first monitoring image and at least one target product corresponding to the operation action, wherein the operation action comprises: a taking-out action and a putting-back action; acquiring SKU information of the at least one target product and coded information of a target container to which the at least one target product is put back; judging whether the SKU information of the at least one target product matches the coded information of the target container based on the association relationship between the container and the product; and if not, prompting a misplacement of the product.

In some embodiments, the method further comprises: setting a correspondence between a weighing device and the coded information of the container, wherein the weighing device is used for acquiring the weight of the products carried by the container corresponding to the weighing device; and when it is determined that the weight of the products is reduced or increased based on a weight detection signal sent by the weighing device, determining the coded information of the container in which the weight of the products is reduced or increased and the change value of the weight of the products according to the correspondence.

The embodiments of the present disclosure provide a device for identifying a product purchased by a user, comprising: a processor; and a memory coupled to the processor, storing program instructions which, when executed by the processor, cause the processor to: acquire a weight of products carried in a container; acquire a first monitoring image acquired in a monitoring area corresponding to the container, identify the first monitoring image, and obtain an identification result, wherein the identification result comprises user identity information; acquire a time when at least one product carried in the container is picked up when it is determined that the weight of the products is reduced, and determine information of at least one picked-up product based on a change value of the weight of the products and an association relationship between the container and the products; obtain user identity information corresponding to the at least one picked-up product based on the time when the at least one product carried in the container is picked up and the identification result; and associate the user identity information with the information of the picked-up product.

In some embodiments, the obtaining user identity information corresponding to the at least one picked-up product based on the time when the at least one product carried in the container is picked up and the identification result comprises: determining a user identity identification time period based on the time when the at least one product carried in the container is picked up; acquiring the identification result corresponding to the first monitoring image acquired in the user identity identification time period as a target identification result; and if the user identity information in the target identification result is not a null value, taking the user identity information in the target identification result as the user identity information corresponding to the at least one picked-up product.

The embodiments of the present disclosure provide a non-transitory computer-readable storage medium having stored thereon computer program instructions which, when executed by one or more processors, cause the one or more processors to: acquire a weight of products carried in a container; acquire a first monitoring image acquired in a monitoring area corresponding to the container, identify the first monitoring image, and obtain an identification result, wherein the identification result comprises user identity information; acquire a time when at least one product carried in the container is picked up when it is determined that the weight of the products is reduced, and determine information of at least one picked-up product based on a change value of the weight of the products and an association relationship between the container and the products; obtain user identity information corresponding to the at least one picked-up product based on the time when the at least one product carried in the container is picked up and the identification result; and associate the user identity information with the information of the at least one picked-up product.

In some embodiments, the obtaining user identity information corresponding to the at least one picked-up product based on the time when the at least one product carried in the container is picked up and the identification result comprises: determining a user identity identification time period based on the time when the at least one product carried in the container is picked up; acquiring the identification result corresponding to the first monitoring image acquired in the user identity identification time period as a target identification result; and if the user identity information in the target identification result is not a null value, taking the user identity information in the target identification result as the user identity information corresponding to the at least one picked-up product.

The embodiments of the present disclosure provide an intelligent shelf system, comprising: the device for identifying a product purchased by a user as described above.

In some embodiments, the intelligent shelf system comprises: a shelf body; at least one container placed on the shelf body for carrying a product; a weight sensor configured to detect a weight of products carried by the container; a first camera device configured to acquire a first monitoring image in a monitoring area corresponding to the container, wherein the device for identifying a product purchased by a user, is respectively electrically connected with the weight sensor and the first camera device and configured to acquire the first monitoring image and a weight signal sent by the weight sensor.

In some embodiments, the intelligent shelf system comprises: a laminated plate placed on the shelf body, wherein the container is placed on the laminated plate, the weight sensor is mounted on the laminated plate and below the container, and the weighing device is arranged corresponding to the container.

In some embodiments, the intelligent shelf system further comprises: a second camera device configured to acquire a second monitoring image in the shopping place; wherein the device for identifying a product purchased by a user is electrically connected with the second camera device and further configured to acquire the second monitoring image.

In some embodiments, the intelligent shelf system further comprises: a prompting device electrically connected with the device for identifying a product purchased by a user, and configured to receive product misplacement prompt information sent by the device for identifying a product purchased by a user and prompt the user.

Other features and advantages of the present disclosure will become clear through detailed descriptions of the illustrative embodiments of the present disclosure with reference to the following accompanying drawings.

BRIEF DESCRIPTION OF THE DRAWINGS

In order to more clearly illustrate the embodiments of the present disclosure or the technical solutions in the related art, the drawings used in the description of the embodiments or related art will be briefly introduced below, and it is obvious that the drawings in the description below are only some embodiments of the present disclosure, and for those skilled in the art, other drawings can be obtained from these drawings without creative efforts.

FIGS. 7A to 7F are schematic diagrams illustrating some embodiments of an intelligent shelf system according to the present disclosure, wherein FIG. 7A is a schematic diagram illustrating connections between the device for identifying a product purchased by a user and other components, FIGS. 7B, 7C, and 7D are a front view, a side view, and a perspective view after the shelf body and the container are mounted, respectively, FIG. 7E is a schematic diagram of the container, and FIG. 7F is a schematic diagram illustrating mounting of the shelf body and a laminated plate etc.

DETAILED DESCRIPTION

The technical solutions in the embodiments of the present disclosure will be described clearly and completely below with reference to the drawings in the embodiments of the present disclosure, and it is obvious that the embodiments described are only some embodiments of the present disclosure, rather than all embodiments. All other embodiments, which can be derived by a person skilled in the art from the embodiments in the present disclosure without making any creative effort, shall fall within the scope of protection of the present disclosure.

The technical solutions in the related art have the following defects: high manpower cost, and difficulty in expanding product categories to a larger scale due to memorization of the product categories and prices by people; the traditional supermarkets scan bar codes, and the access of the product information is completed by a background system, but the operation of scanning bar codes requires consumption of labor and is inefficient, so a jam easily occurs in a payment channel, resulting in a poor user experience; Rfid solution realizes automatic sensing of the purchased product and automation of customer binding, but has the problem of high cost, and in addition, different radio frequencies has an influence on the stability of the product medium and problems such as malicious shielding of a user occur.

The terms "first", "second", or the like below are only for descriptive distinction and do not have other special meanings.

Figure 1:
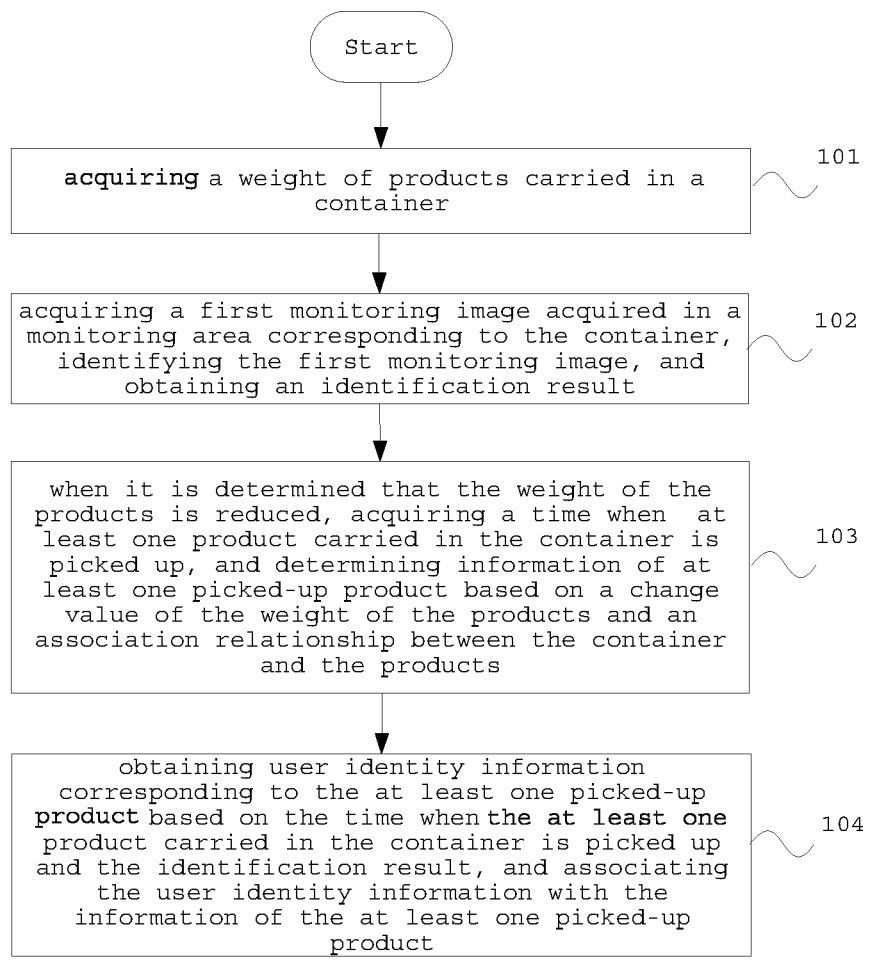
FIG. 1 is a schematic flow chart illustrating some embodiments of a method for identifying a product purchased by a user according to the present disclosure.

FIG. 1 is a schematic flow chart illustrating some embodiments of a method for identifying a product purchased by a user according to the present disclosure, comprising steps 101-104:

Step 101: acquiring a weight of products carried in a container.

The container is a vending box for carrying products and the like, and there are all kinds of containers. For example, in shelves of an unmanned supermarket, a shelf is provided with one or more containers for carrying products. One or more weighing devices are provided in the shelf for measuring a weight of the products carried in the respective containers, one weighing device being capable of measuring the weight of the products carried by one or more containers. The weighing device can acquire the weight of the products through a weight sensor.

Step 102: acquiring a first monitoring image acquired in a monitoring area corresponding to the container, identifying the first monitoring image, and obtaining an identification result, wherein the identification result comprises user identity information which may be user ID etc.

The area in front of or around the container is used as a monitoring area corresponding to the container, a camera or the like is arranged to acquire the first monitoring image in the monitoring area, and actions such as the user taking and placing a product on the shelf can be acquired through the first monitoring image. The image recognition of the first monitoring image may adopt various models, for example, various neural network models trained in advance.

Step 103: when it is determined that the weight of the products is reduced, acquiring a time when at least one product carried in the container is picked up, and determining information of the at least one picked-up product based on a change value of the weight of the products and an association relationship between the container and the products.

Step 104: obtaining user identity information corresponding to the at least one picked-up product based on the time when the at least one product carried in the container is picked up and the identification result, and associating the user identity information with the information of the at least one picked-up product. Automatic sensing of the purchased product and automatic binding of the product information to the user identity can be realized by combining the sensor technology and the image identification technology.

Figure 2:
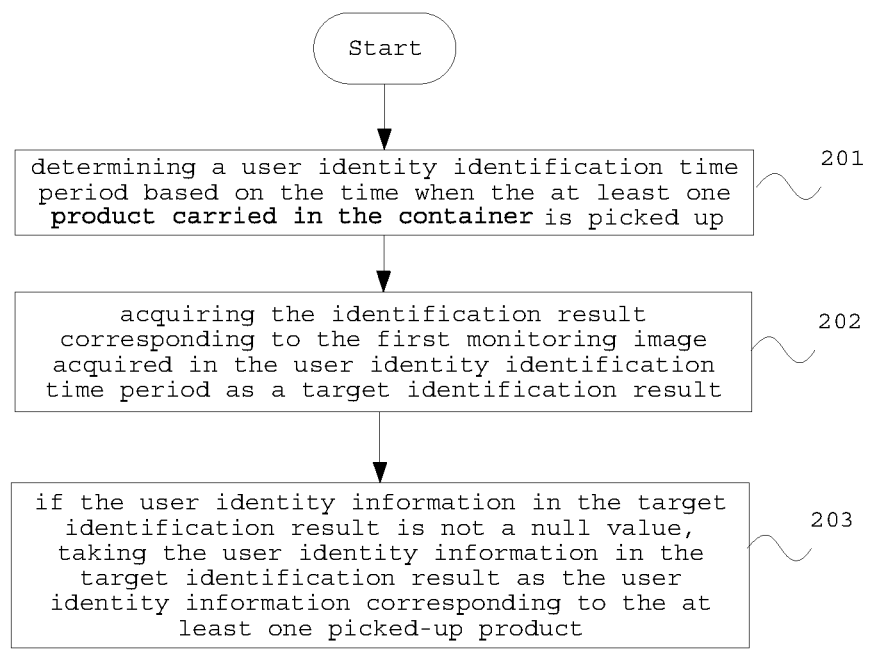
FIG. 2 is a schematic flow chart illustrating a process of determining user identity information based on the image identification result in some embodiments of the method for identifying a product purchased by a user according to the present disclosure.

In some embodiments, there may be various ways for obtaining user identity information corresponding to the at least one picked-up product based on the time when the at least one product carried in the container is picked up and the identification result. For example, FIG. 2 is a schematic flowchart illustrating a process of determining user identity information based on the image identification result in some embodiments of the method for identifying a product purchased by a user according to the present disclosure, comprising steps 201-203.

Step 201: determining a user identity identification time period based on the time when the at least one product carried in the container is picked up.

The user identity identification time period may be a time period between several seconds before and after the time when the product is picked up. For example, when it is determined that the weight of the products is reduced, the time when the product is picked up is 10:00:00, then the user identity identification time period is a time period between 9:59:58 and 10:00:02.

Step 202: acquiring the identification result corresponding to the first monitoring image acquired in the user identity identification time period as a target identification result. For example, the identification result for the first monitoring image between 9:59:58 and 10:00:02 is acquired as the target identification result.

Step 203: if the user identity information in the target identification result is not a null value, taking the user identity information in the target identification result as the user identity information corresponding to the at least one picked-up product.

If the user identity information in the target identification result is not a null value, this means that the user identity identification based on the first monitoring image is successful, and if the user identity information in the target identification result is a null value, this means that the user identity identification based on the first monitoring image is failed.

Figure 3:
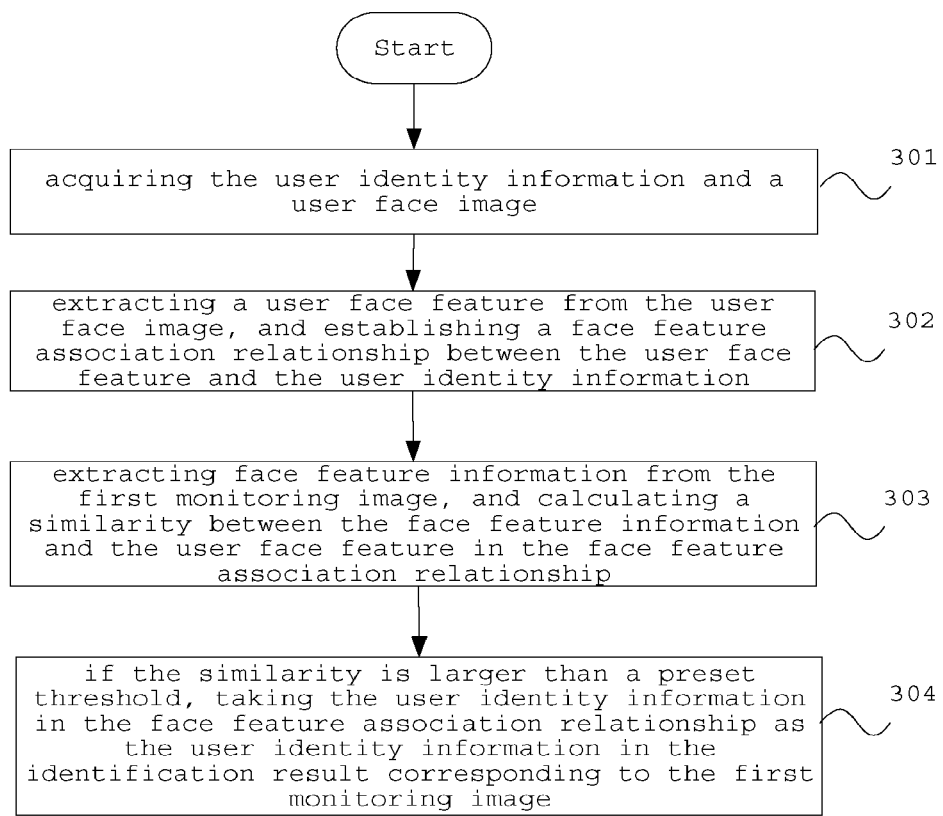
FIG. 3 is a schematic flow chart illustrating a process of identifying the monitoring image in some embodiments of the method for identifying a product purchased by a user according to the present disclosure.

FIG. 3 is a schematic flow chart illustrating a process of identifying the monitoring image in some embodiments of the method for identifying a product purchased by a user according to the present disclosure, comprising steps 301-304:

Step 301: acquiring the user identity information and a user face image.

Step 302: extracting a user face feature from the user face image, and establishing a face feature association relationship between the user face feature and the user identity information.

For example, when the user enters an unmanned supermarket, identity authentication is performed at the door of the supermarket, and an image of the user is acquired. If the identity authentication is successful, user identity information (user ID and the like) is obtained, a user face feature is extracted from the acquired user image, and a face feature association relationship is established between the user face feature and the user identity information.

Step 303: extracting face feature information from the first monitoring image, and calculating a similarity between the face feature information and the user face feature in the face feature association relationship.

Step 304: if the similarity is larger than a preset threshold, taking the user identity information in the face feature association relationship as the user identity information in the identification result corresponding to the first monitoring image. If the similarity is less than or equal to the preset threshold, the user identity identification is failed.

By shooting in real time through a camera device and acquiring the first monitoring image from the camera device in real time, a plurality of pictures are acquired per second, and a face recognition algorithm is called to perform face recognition respectively, for example, using a SIFT algorithm and the like for face recognition, and identification results are stored into a database.

Each container is coded in advance, and products placed in the container and positions of placement of the products are determined. The coded information of the container and SKU information of the products placed on the container are acquired, and the association relationship between the container and the products is established according to the coded information and the SKU information.

After the first monitoring image is acquired, face recognition is carried out on the first monitoring image through an identifying thread, and the time when the first monitoring image is acquired, the identification result, a camera number and the like are stored in the database. The camera number is associated with the coded information of the container, and a target identification result can be obtained from the database according to the user identity identification time period and the camera number.

A correspondence between the weighing device and the coded information of the container is set, wherein the weighing device is used for detecting the weight of the products carried by a corresponding container. When it is determined that the weight of the products is reduced or increased based on a weight detection signal sent by the weighing device, the coded information of the container in which the weight of the products is reduced or increased and the change value of the weight of the products are determined according to the correspondence.

The coded information of the container in which the weight of the products is reduced is determined, and the SKU information of the at least one picked-up product is determined based on the coded information and the association relationship between the container and the products. A product unit weight corresponding to the SKU information of the product is acquired, and quantity information of the at least one picked-up product is determined based on the product unit weight and a reduced value of the weight of the products.

The weighing device may record the weight in each container at the time of initialization, calculate the decreased or increased weight when at least one product carried in the container is picked up or put back, obtain the decreased weight information, and divide the weight by a unit weight of the product sku to calculate how many products have been picked up or put back.

When it is determined that the weight of the products is increased, an increased value of the weight of the products is obtained, and it is judged whether the unit weight of the product matches the increased value of the weight of the products, and if not, misplacement of the product is prompted. For example, the unit weight of the product A placed in the container A is 100 g, and when it is determined that the weight of the container A is increased by 30 g, then the unit weight of the product A does not match the increased value of the weight of all products A carried in the container A, and misplacement of the product is prompted, which can be made by playing a prompt voice or displaying a prompt message on a display screen.

Operation actions of the user in the first monitoring image and at least one target product corresponding to the operation actions are identified, wherein the operation actions comprise a taking-out action, a putting-back action and the like. For the identification of the first monitoring image, a pre-trained neural network model may be used, and in the training stage, image data labeled with the product sku and image data of the taking-out action and the putting-back action may be used for training. Behavior identification can be derived by extracting and analyzing features of user gestures by using a trained neural network model.

The SKU information of the at least one target product and the coded information of the target container to which the at least one target product is put back can be obtained through image recognition. There are various ways for obtaining the coded information of the at least one target container to which the target product is put back, for example, an original product in the target container may be determined through image recognition, so as to determine sku of the original product, and the coded information of the target container is obtained based on the sku of the original product. It is judged whether the SKU information of the at least one target product matches the coded information of the target container based on the association relationship between the container and the products, and if not, misplacement of the product is prompted.

Figure 4:
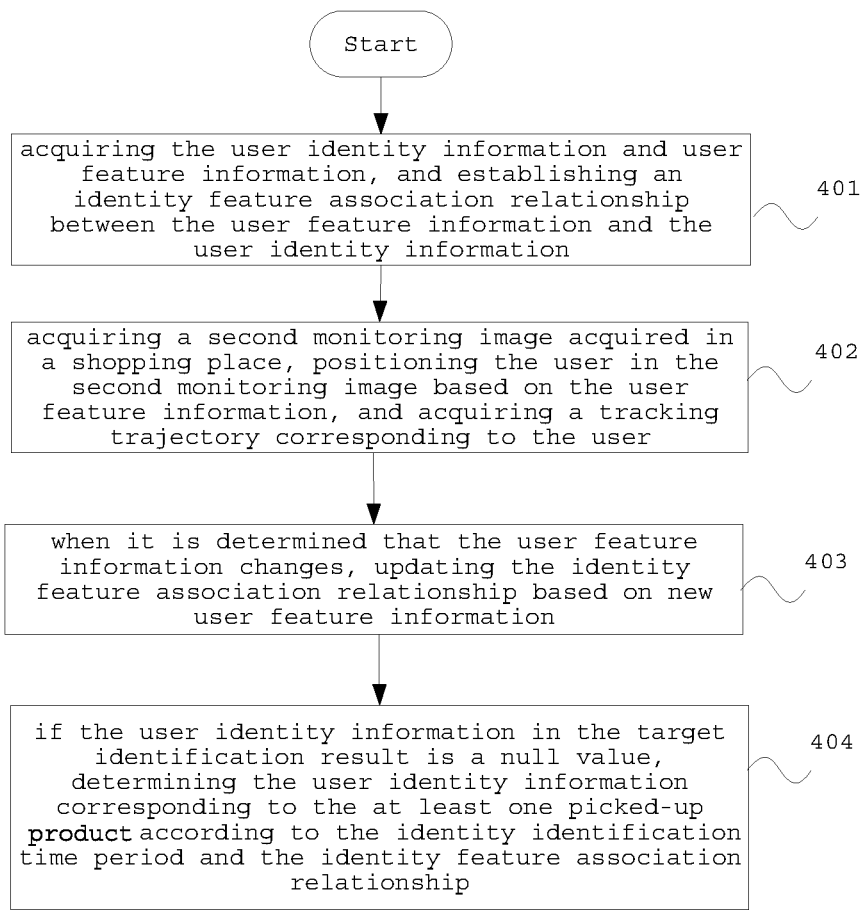
FIG. 4 is a schematic flow chart illustrating a process of determining user identity information based on user tracking in some embodiments of the method for identifying a product purchased by a user according to the present disclosure.
Figure 5:
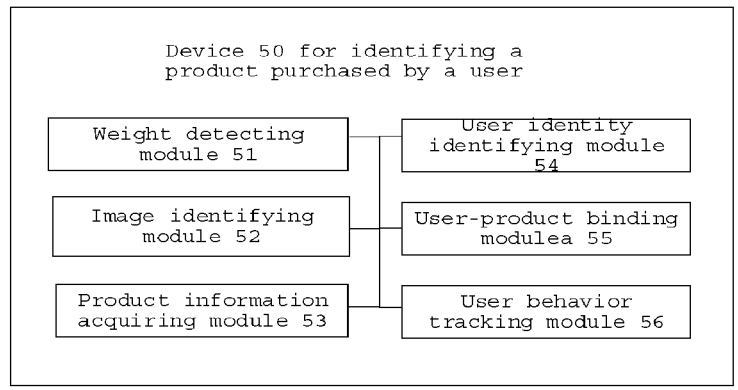
FIG. 5 is a schematic block diagram illustrating some embodiments of a device for identifying a product purchased by a user according to the present disclosure.

FIG. 4 is a schematic flow chart illustrating a process of determining user identity information based on user tracking in some embodiments of the method for identifying a product purchased by a user according to the present disclosure, comprising steps 401-403:

Step 401: acquiring the user identity information and user feature information, establishing an identity feature association relationship between the user feature information and the user identity information.

For example, when a user enters an unmanned supermarket, identity authentication is carried out at an entrance and a user image is acquired. If the identity authentication is successful, user identity information (user ID and the like) is acquired, and user feature information is extracted from the acquired user image, wherein the user feature information comprises: clothes style, clothes color, body feature and etc.

Step 402: acquiring a second monitoring image acquired in a shopping place, positioning the user in the second monitoring image based on the user feature information, and acquiring a tracking trajectory corresponding to the user.

Step 403: when it is determined that the user feature information changes, updating the identity feature association relationship based on new user feature information.

The shopping place comprises shopping areas, corridors and other areas, and the user is positioned in the second monitoring image by adopting a target tracking algorithm based on the clothing style, the clothing color, the body feature and etc. of the user, to acquire a tracking trajectory of the user, namely a motion trajectory of the user. There are various kinds of tracking algorithms, such as a KCF algorithm. If the feature information of the user is changed, for example, the user takes off the coat, wears a mask and etc., new user feature information of the user is determined, and the identity feature association relationship is updated based on the new user feature information.

Step 404: if the user identity information in the target identification result is a null value, determining the user identity information corresponding to the picked-up product according to the identity identification time period and the identity feature association relationship.

For example, when the user wears a mask after entering an unmanned supermarket, the identification of the user identity based on the first monitoring image is failed, then the user identity information in the target identification result is a null value. When the user identity information is associated with the information of the at least one picked-up product, the user identity information in the target identification result is a null value, then the first monitoring image acquired in the identity identification time period is acquired, and the user feature information of the target user is extracted from the first monitoring image. The user feature information of the target user is compared with the user feature information in the identity feature association relationship, and the user feature information at this time is a new user feature updated in real time; if there is a successful match, the user identity information in the identity feature association relationship is taken as the user identity information corresponding to the at least one picked-up product.

In some embodiments, when the user A enters an unmanned supermarket, the user A is identified according to the face identification technology; if the user A is determined to be a legal user, the verification is successful, and the obtained user identity information is the user ID. A face feature association relationship between the user face feature of the user A and the user identity information is established. The clothing style, the clothing color, the body feature and etc. of the user A are extracted as the user feature information, and an identity feature association relationship is established between the user feature information and the user identity information.

The user feature information (such as jacket color, top of head) of the user A is tracked and analyzed by using a target tracking algorithm, and the user feature information of the user A is updated in real time. Before the user A arrives at the container A, the camera acquires the first monitoring image and then carries out face recognition, and after the user A is identified, the user id of the user A, the current time and the camera information are stored in a database.

After the user A picks up a product in the container A, a reduction of the weight is determined according to a signal sent by a weight sensor in the weighing device; by setting a starting time by pushing forwards for 3 s according to the current time and an ending time by pushing backwards for 2 s, a user identity identification time period is set. Data stored in the database within the user identify identification time period are queried to acquire the user ID of the user A, the sku of the product carried by the container A and an inherent weight of the sku are determined according to the container A, a number of the products picked up by the user A is calculated by dividing the reduced value of the weight by the inherent weight, and the user ID of the user A and the product sku are bound to the number of the products picked up by the user A.

If the identity of the user cannot be identified based on the first monitoring image, the user A is confirmed according to the first monitoring image acquired within the user identity identification time period and the new user feature information of the user A, and then the ID of the user A is determined, and the user ID of the user A and the product sku are bound to the number of the products pickup up by the user A, thereby achieving a take it-and-go selling mode.

In some embodiments, the present disclosure provides a device 50 for identifying a product purchased by a user, comprising: a weight detecting module 51, an image identifying module 52, a product information acquiring module 53, a user identity identifying module 54, a user-product binding module 55 and a user behavior tracking module 56.

The weight detecting module 51 is configured to acquire a weight of all products carried in a container. The image identifying module 52 is configured to acquire a first monitoring image acquired in a monitoring area corresponding to the container, identifying the first monitoring image, and obtaining an identification result, wherein the identification result comprises user identity information, and the like. The product information acquiring module 53 configured to, when it is determined that the weight of the products is reduced, acquire a time when at least one product carried in the container is picked up, and determine information of at least one picked-up product based on a change value of the weight of the products and an association relationship between the container and the products. The user identity identifying module 54 is configured to obtain user identity information corresponding to the at least one picked-up product based on the time when the at least one product carried in the container is picked up and the identification result. The user-product binding module 55 is configured to associate the user identity information with the information of the picked-up product.

In some embodiments, the user identity identifying module 54 determines a user identity identification time period based on the time when the at least one product carried in the container is picked up. The user identity identifying module 54 acquires the identification result corresponding to the first monitoring image acquired in the user identity identification time period as a target identification result. If the user identity information in the target identification result is not a null value, the user identity identifying module 54 takes the user identity information in the target identification result as the user identity information corresponding to the at least one picked-up product.

The user behavior tracking module 56 acquires the user identity information and user feature information, and establishes an identity feature association relationship between the user feature information and the user identity information. The user behavior tracking module 56 acquires a second monitoring image acquired in a shopping place, positions the user in the second monitoring image based on the user feature information, and acquires a tracking trajectory corresponding to the user. When it is determined that the user feature information changes, the user behavior tracking module 56 updates the identity feature association relationship based on new user feature information. If the user identity information in the target identification result is a null value, the user identity identifying module 54 determines the user identity information corresponding to the at least one picked-up product according to the identity identification time period and the identity feature association relationship.

The user identity identifying module 54 acquires the first monitoring image acquired in the identity identification time period, and extracts user feature information of a target user from the first monitoring image. The user identity identifying module 54 compares the user feature information of the target user with the user feature information in the identity feature association relationship. If there is a successful match, the user identity identifying module 54 takes the user identity information in the identity feature association relationship as the user identity information corresponding to the at least one picked-up product.

In some embodiments, the image identifying module 52 acquires the user identity information and a user face image. The image identifying module 52 extracts a user face feature from the user face image, and establishes a face feature association relationship between the user face feature and the user identity information. The image identifying module 52 extracts face feature information from the first monitoring image, and calculates a similarity between the face feature information and the user face feature in the face feature association relationship. If the similarity is larger than a preset threshold, the image identifying module 52 takes the user identity information in the face feature association relationship as the user identity information in the identification result corresponding to the first monitoring image.

The image identifying module 52 identifies an operation action of the user in the first monitoring image and at least one target product corresponding to the operation action, wherein the operation action comprises: a taking-out action, a putting-back action and etc. The image identifying module 52 acquires SKU information of the at least one target product and coded information of a target container to which the at least one target product is put back. The image identifying module 52 judges whether the SKU information of the at least one target product matches the coded information of the at least one target container based on the association relationship between the container and the product; and if not, prompts a misplacement of the product.

In some embodiments, the weight detecting module 51 sets a correspondence between a weighing device and the coded information of the container, wherein the weighing device is used for detecting the weight of products carried by the container corresponding to the weighing device. When it is determined that the weight of the products is reduced or increased based on a weight detection signal sent by the weighing device, the weight detecting module 51 determines the coded information of the container in which the weight of the product is reduced or increased and the change value of the weight of the products according to the correspondence.

The product information acquiring module 53 acquires coded information of the container and SKU information of the products placed on the container; and establishes an association relationship between the container and the products according to the coded information and the SKU information. The product information acquiring module 53 determines the coded information of the container in which the weight of the products is reduced, and determines the SKU information of the at least one picked-up product based on the coded information and the association relationship between the container and the product. The product information acquiring module 53 acquires a product unit weight corresponding to the SKU information of the product, and determines quantity information of the at least one picked-up product based on the product unit weight and a reduced value of the weight of the products.

When it is determined that the weight of the products is increased, the product information acquiring module 53 obtains an increase in the weight of the products, and judges whether the product unit weight matches the increase in the weight of the products, and if not, prompts a misplacement of the product.

Figure 6:
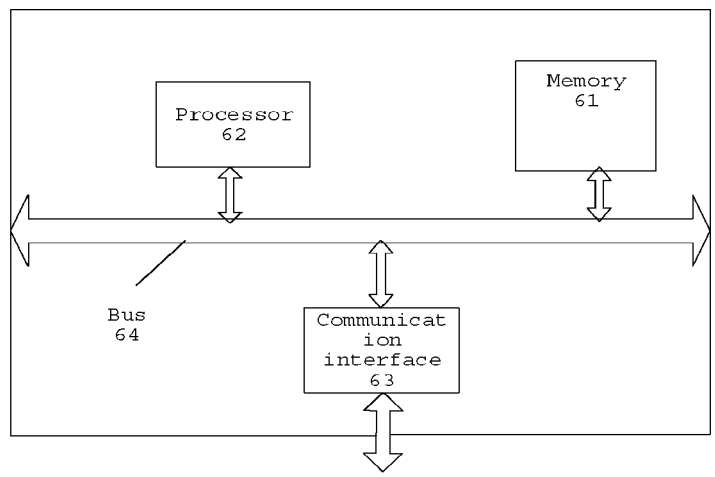
FIG. 6 is a schematic block diagram illustrating some other embodiments of the device for identifying a product purchased by a user according to the present disclosure.
Figure 7A:
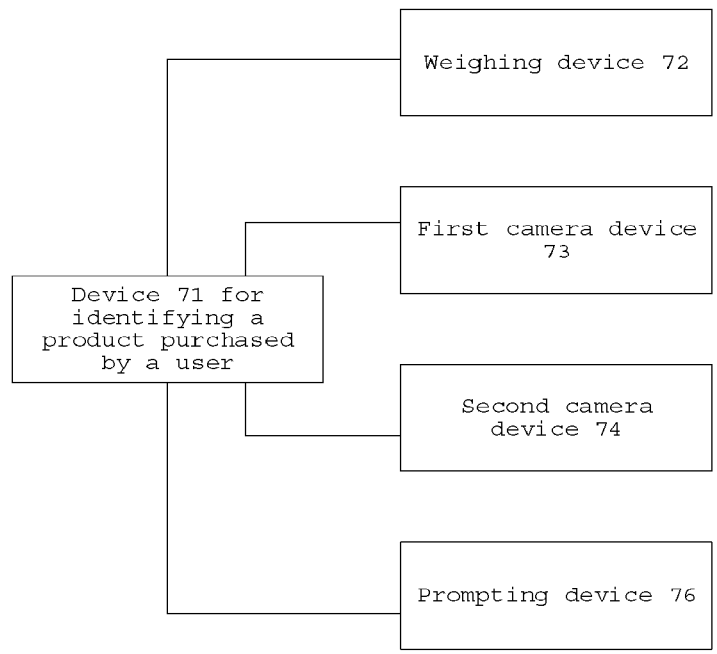
Figure 7B:
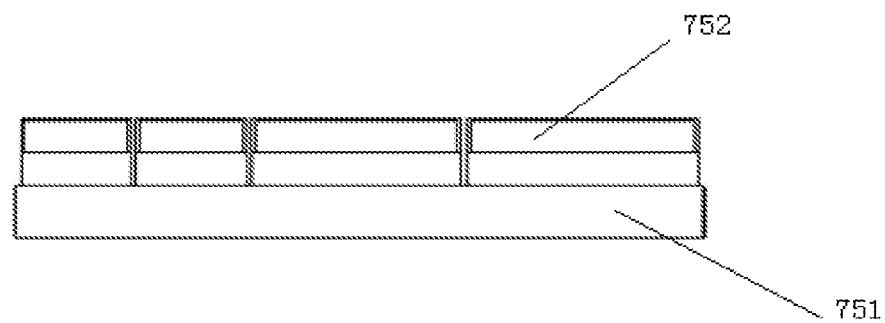
Figure 7C:
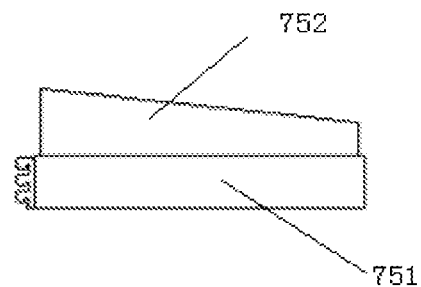
Figure 7D:
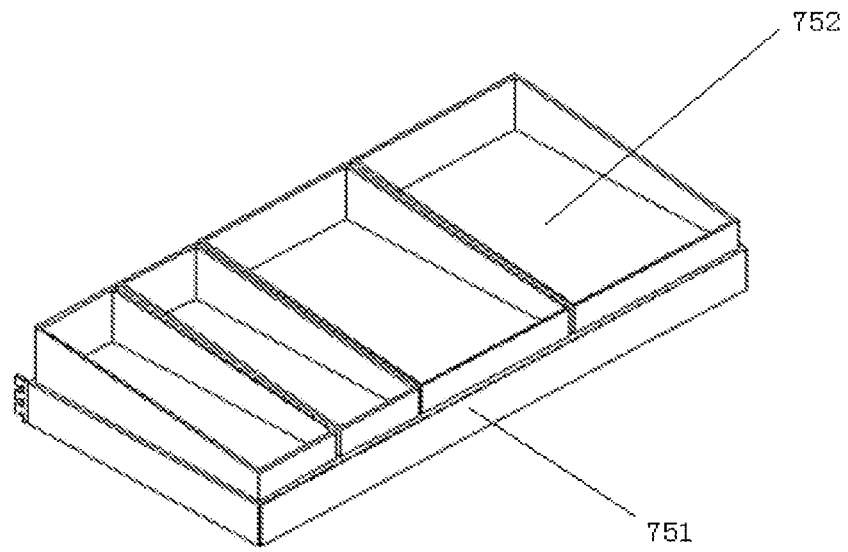
Figure 7E:
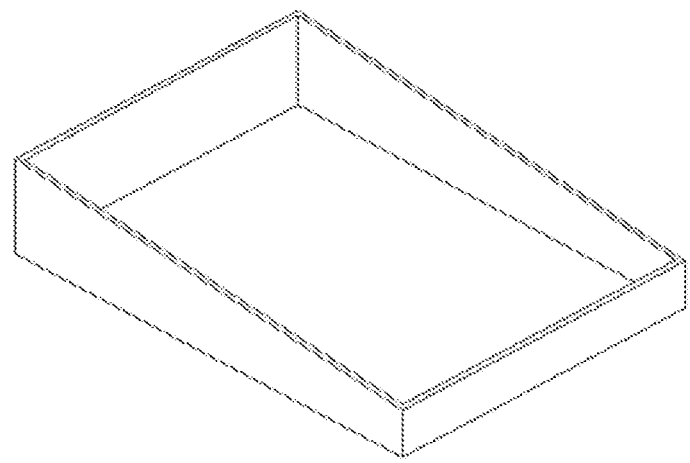
Figure 7F:
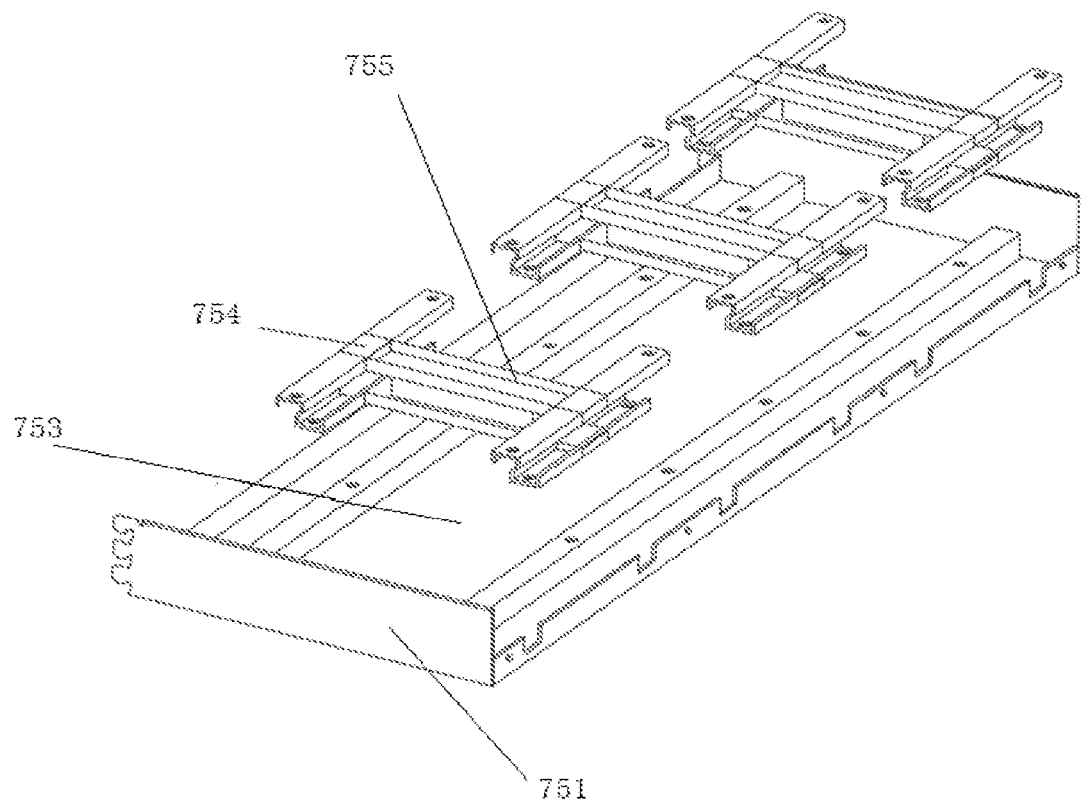

FIG. 6 is a schematic block diagram illustrating some other embodiments of the device for identifying a product purchased by a user according to the present disclosure, and as shown in FIG. 6, the device may comprise a memory 61, a processor 62, a communication interface 63, and a bus 64. The memory 61 is used for storing instructions, the processor 62 is coupled to the memory 61, and the processor 62 is configured to perform the method for identifying a product purchased by a user based on the instructions stored in the memory 61.

The memory 61 may be a high-speed RAM memory, a non-volatile memory, etc., and the memory 61 may be a memory array. The memory 61 may also be divided into blocks and the blocks may be combined into virtual volumes according to certain rules. The processor 62 may be a central processing unit CPU, or an Application Specific Integrated Circuit (ASIC), or one or more integrated circuits configured to implement the method for identifying a product purchased by a user according to the present disclosure.

In some embodiments, the present disclosure further provides a computer-readable storage medium having stored thereon computer instructions, which, when executed by a processor, implement the method for identifying a product purchased by a user according to any of the above embodiments. As will be appreciated by one of skill in the art, the embodiments of the present disclosure may be provided as a method, device, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-available non-transitory storage medium (including but not limited to, disk storage, CD-ROM, optical storage, and so forth) having computer-available program codes embodied therein.

The present disclosure is described with reference to the flow charts and/or block diagrams of methods, devices (systems), and computer program products according to the embodiments of the present disclosure. It will be understood that each step and/or block of the flow charts and/or block diagrams as well as a combination of steps and/or blocks of the flow charts and/or block diagrams may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block diagram.

In some embodiments, as shown in FIGS. 7A-7F, the present disclosure provides an intelligent shelf system comprising: a shelf body 751 that includes a shelf border, a shelf support, etc. At least one container 752 is placed on the shelf body 751 for carrying a product, and the container 752 may be a vending box of various shapes. The material of the container 752 may be plastic, for example, the container 752 is made of acrylic.

The weighing device 754 detects a weight of products carried by the container 752. The first camera device acquires a first monitoring image in a monitoring area corresponding to the container 752, and the first camera device may be a camera, a video camera, etc. The device 71 for identifying a product purchased by a user is respectively electrically connected with the weighing device 72 and the first camera device 73, and configured to acquire the first monitoring image and a weight signal sent by the weighing device, identify the first monitoring image to obtain user identity information, and associate the user identity information with information of the product picked up from the container.

A laminated plate 755 is placed on the shelf body 751, and the container 752 is placed on the laminated plate 755; the weighing device 754 is mounted on the laminated plate 753 and below the container, wherein the weighing device 754 is arranged corresponding to the container 752. Each product is placed in a container 752 and a weighing device 754 corresponding thereto obtains a weight of the product carried by the container 752.

A weighing mounting member 755 is disposed between the laminated plate 753 and the container 752, and is fixedly connected to the laminated plate 752, which may be a threaded connection, a snap connection, or the like. The weighing device 754 is fixedly mounted on the weighing mounting member 755. The weighing mounting member 755 may be of various configurations, for example, the weighing mounting member 755 may be of an I-shaped configuration. The weighing device 754 is fixed inside the I-shaped weighing mounting member 755 by means of screws, and the weighing mounting member 755 is disposed at a position corresponding to the container 752.

In some embodiments, the weighing device 754 includes a weight sensor connected to the device 71 for identifying a product purchased by a user. The weight sensor may be connected to the device 71 for identifying a product purchased by a user through a 485 bus or the like, detect the weight of the products carried by the container 752, and transmit a weight detection signal to the device 71 for identifying a product purchased by a user.

The second camera device 74 acquires a second monitoring image in the shopping place, wherein the shopping place includes vending areas, corridors, aisles, etc., and the second camera device 74 may be a camera, a video camera, etc. The device 71 for identifying a product purchased by a user is electrically connected with the second camera device 74, and configured to position the user in the second monitoring image, obtain a tracking trajectory corresponding to the user and new user feature information, and determine the user identity information corresponding to the picked-up product based on the new user feature information.

A prompting device 76 is electrically connected with the device 71 for identifying a product purchased by a user, and configured to receive product misplacement prompt information sent by the device 71 for identifying a product purchased by a user and prompt the user. The prompting device 76 includes a display, a speaker, and the like, and can prompt the user that the product is misplaced by sound, text information, or the like.

In the method and device for identifying a product purchased by a user and the intelligent shelf system in the above embodiments, the weight of the product carried by the container is detected, the user identity information is obtained by carrying out image recognition on the monitoring image acquired in the monitoring area corresponding to the container, and when it is determined that the weight of the product is reduced, the information of the picked-up product is determined and the user identity information is associated with the information of the picked-up product; automatic sensing of the purchased product and automatic binding of the product information to the user identity are realized by combining the sensor technology and the image recognition technology, to solve the problems of automatic sensing of the purchased product and the binding of the product to the customer in retail stores; the intelligent shelf is used as a carrier and can automatically sense the product purchased by the user, so that labor cost is saved; the identification is fast and accurate, and the shopping efficiency is improved; and no user operation is required to bind the product to the user, thus improving the shopping experience.

The method and system of the present disclosure may be implemented in many manners. For example, the method and system of the present disclosure may be implemented by a software, hardware, firmware, or any combination of a software, hardware, and firmware. The above-described sequence of steps for the method is for illustrative purposes only, and the steps of the method of the present disclosure are not limited to the sequence specifically described above unless otherwise specifically stated. Moreover, in some embodiments, the present disclosure may also be embodied as programs recorded in a recording medium, which include machine readable instructions for implementing the method according to the present disclosure. Thus, the present disclosure also covers a recording medium storing programs for performing the method according to the present disclosure.

The description of the present disclosure has been presented for purposes of illustration and description, and is not intended to be exhaustive or limited to the disclosure in the form disclosed. Many modifications and variations will be apparent to those skilled in the art. The embodiments were chosen and described in order to better explain principles of the disclosure and practical applications thereof, and to enable those skilled in the art to understand the present disclosure, thereby designing various embodiments with various modifications suited to particular uses.

What is claimed is:

1. A method for identifying a product purchased by a user, comprising:
   acquiring a weight of products carried in a container;
   acquiring a first monitoring image acquired in a monitoring area corresponding to the container, identifying the first monitoring image, and obtaining an identification result, wherein the identification result comprises user identity information;
   when it is determined that the weight of the products is reduced, acquiring a time when at least one product carried in the container is picked up, and determining information of at least one picked-up product based on a change value of the weight of the products and an association relationship between the container and the products;
   obtaining user identity information corresponding to the at least one picked-up product based on the time when the at least one product carried in the container is picked up and the identification result, and associating the user identity information with the information of the at least one picked-up product
   wherein the obtaining user identity information corresponding to the at least one picked-up product based on the time when the at least one product carried in the container is picked up and the identification result comprises:
   determining a user identity identification time period based on the time when the at least one product carried in the container is picked up;
   acquiring the identification result corresponding to the first monitoring image acquired in the user identity identification time period as a target identification result;
   if the user identity information in the target identification result is not a null value, taking the user identity information in the target identification result as the user identity information corresponding to the at least one picked-up product;
   acquiring the user identity information and user feature information, and establishing an identity feature association relationship between the user feature information and the user identity information;
   acquiring a second monitoring image acquired in a shopping place, positioning the user in the second monitoring image based on the user feature information, and acquiring a tracking trajectory corresponding to the user;
   when it is determined that the user feature information changes, updating the identity feature association relationship based on new user feature information; and
   if the user identity information in the target identification result is a null value, determining the user identity information corresponding to the at least one picked-up product according to the identity identification time period and the identity feature association relationship.

2. The method according to claim 1, wherein the determining the user identity information corresponding to the at least one picked-up product according to the identity identification time period and the identity feature association relationship comprises:
   acquiring the first monitoring image acquired in the identity identification time period, and extracting user feature information of a target user from the first monitoring image;
   comparing the user feature information of the target user with the user feature information in the identity feature association relationship; and
   if there is a successful match, taking the user identity information in the identity feature association relationship as the user identity information corresponding to the at least one picked-up product.

3. The method according to claim 1, wherein the identifying the first monitoring image and obtaining an identification result comprises:
   acquiring the user identity information and a user face image;
   extracting a user face feature from the user face image, and establishing a face feature association relationship between the user face feature and the user identity information;
   extracting face feature information from the first monitoring image, and calculating a similarity between the face feature information and the user face feature in the face feature association relationship; and
   if the similarity is larger than a preset threshold, taking the user identity information in the face feature association relationship as the user identity information in the identification result corresponding to the first monitoring image.

4. The method according to claim 1, further comprising:
   acquiring coded information of the container and Stock Keeping Unit (SKU) information of the products placed on the container; and
   establishing an association relationship between the container and the products according to the coded information and the SKU information.

5. The method according to claim 4, wherein the determining information of the at least one picked-up product based on a change value of the weight of the products and an association relationship between the container and the products comprises:
   determining the coded information of the container in which the weight of the products is reduced, and determining the SKU information of the picked-up product based on the coded information and the association relationship between the container and the product.

6. The method according to claim 5, wherein the determining information of the at least one picked-up product based on a change value of the weight of the products and an association relationship between the container and the products further comprises:
   acquiring a product unit weight corresponding to the SKU information of the product; and
   determining quantity information of the at least one picked-up product based on the product unit weight and a reduced value of the weight of the products.

7. The method according to claim 6, further comprising:

when it is determined that the weight of the products is increased, obtaining an increase in the weight of the products; and judging whether the product unit weight matches the increase in the weight of the products, and if not, prompting a misplacement of the product.

8. The method according to claim 4, further comprising:

identifying an operation action of the user in the first monitoring image and at least one target product corresponding to the operation action, wherein the operation action comprises: a taking-out action and a putting-back action;

acquiring SKU information of the at least one target product and coded information of a target container to which the at least one target product is put back;

judging whether the SKU information of the at least one target product matches the coded information of the target container based on the association relationship between the container and the product; and if not, prompting a misplacement of the product.

9. The method according to claim 1, further comprising:

setting a correspondence between a weighing device and the coded information of the container, wherein the weighing device is used for detecting the weight of the products carried by the container corresponding to the weighing device; and when it is determined that the weight of the products is reduced or increased based on a weight detection signal sent by the weighing device, determining the coded information of the container in which the weight of the products is reduced or increased and the change value of the weight of the products according to the correspondence.

10. A device for identifying a product purchased by a user, comprising:

a memory; and a processor; and coupled to the memory, the processor configured to execute the method for identifying a product purchased by a user a memory coupled to the processor, storing program instructions which, when executed by the processor, cause the processor to:

acquire a weight of products carried in a container;

acquire a first monitoring image acquired in a monitoring area corresponding to the container, identify the first monitoring image, and obtain an identification result, wherein the identification result comprises user identity information;

acquire a time when at least one product carried in the container is picked up when it is determined that the weight of the products is reduced, and determine information of at least one picked-up product based on a change value of the weight of the products and an association relationship between the container and the products;

obtain user identity information corresponding to the at least one picked-up product based on the time when the at least one product carried in the container is picked up and the identification result;

wherein the obtaining user identity information corresponding to the at least one picked-up product based on the time when the at least one product carried in the container is picked up and the identification result comprises:

determining a user identity identification time period based on the time when the at least one product carried in the container is picked up;

acquiring the identification result corresponding to the first monitoring image acquired in the user identity identification time period as a target identification result; and if the user identity information in the target identification result is not a null value, taking the user identity information in the target identification result as the user identity information corresponding to the at least one picked-up product;

associate the user identity information with the information of the at least one picked-up product;

acquire the user identity information and user feature information, and establish an identity feature association relationship between the user feature information and the user identity information;

acquire a second monitoring image acquired in a shopping place, positioning the user in the second monitoring image based on the user feature information, and acquire a tracking trajectory corresponding to the user;

when it is determined that the user feature information changes, update the identity feature association relationship based on new user feature information; and if the user identity information in the target identification result is a null value, determine the user identity information corresponding to the at least one picked-up product according to the identity identification time period and the identity feature association relationship.

11. A non-transitory computer-readable storage medium having stored thereon computer program instructions which, when executed by one or more processors, cause the one or more processors to:

acquire a weight of products carried in a container;

acquire a first monitoring image acquired in a monitoring area corresponding to the container, identify the first monitoring image, and obtain an identification result, wherein the identification result comprises user identity information;

acquire a time when at least one product carried in the container is picked up when it is determined that the weight of the products is reduced, and determine information of at least one picked-up product based on a change value of the weight of the products and an association relationship between the container and the products;

obtain user identity information corresponding to the at least one picked-up product based on the time when the at least one product carried in the container is picked up and the identification result;

wherein the obtaining user identity information corresponding to the at least one picked-up product based on the time when the at least one product carried in the container is picked up and the identification result comprises:

determining a user identity identification time period based on the time when the at least one product carried in the container is picked up;

acquiring the identification result corresponding to the first monitoring image acquired in the user identity identification time period as a target identification result; and if the user identity information in the target identification result is not a null value, taking the user identity information in the target identification result as the user identity information corresponding to the at least one picked-up product;

associate the user identity information with the information of the at least one picked-up product;

acquire the user identity information and user feature information, and establish an identity feature association relationship between the user feature information and the user identity information;

acquire a second monitoring image acquired in a shopping place, positioning the user in the second monitoring image based on the user feature information, and acquire a tracking trajectory corresponding to the user;

when it is determined that the user feature information changes, update the identity feature association relationship based on new user feature information; and if the user identity information in the target identification result is a null value, determine the user identity information corresponding to the at least one picked-up product according to the identity identification time period and the identity feature association relationship.

* * * * *